US012371220B2

(12) United States Patent
Tanna

(10) Patent No.: US 12,371,220 B2
(45) Date of Patent: Jul. 29, 2025

(54) STRAPPED LEAFLET UNIT EMBEDDED IN A PACKAGING CONTAINER

(71) Applicant: Tejas Tanna, Mumbai (IN)

(72) Inventor: Tejas Tanna, Mumbai (IN)

( * ) Notice: Subject to any disclaimer, the term of this patent is extended or adjusted under 35 U.S.C. 154(b) by 0 days.

(21) Appl. No.: 18/016,871

(22) PCT Filed: May 14, 2021

(86) PCT No.: PCT/IB2021/054166
§ 371 (c)(1), (2) Date: Jan. 19, 2023

(87) PCT Pub. No.: WO2022/018524
PCT Pub. Date: Jan. 27, 2022

(65) Prior Publication Data

US 2023/0271745 A1 Aug. 31, 2023

(30) Foreign Application Priority Data

Jul. 20, 2020 (IN) ............................ 202021030951

(51) Int. Cl.
*B65D 5/42* (2006.01)
*B31B 50/00* (2017.01)
(Continued)

(52) U.S. Cl.
CPC .......... *B65D 5/4233* (2013.01); *B31B 50/006* (2017.08); *B31B 50/624* (2017.08); (Continued)

(58) Field of Classification Search
CPC ........................... B65D 5/4233; B65D 5/0227; B65D 2203/06; B31B 50/811; B31B 50/624; B31B 50/006
(Continued)

(56) References Cited

U.S. PATENT DOCUMENTS 3,625,412 A * 12/1971 Rosenburg, Jr. ..... B65D 5/4229 229/152
4,413,730 A * 11/1983 Morse .................. B65D 5/4225 206/467
(Continued)

FOREIGN PATENT DOCUMENTS

GB 2483680 A * 3/2012 ........... B65D 5/4204
JP H11278465 A 10/1999

OTHER PUBLICATIONS

International Search Report and Written Opinion for International Application PCT/IB2021/054166; International Filing Date: May 14, 2021; International Date of Mailing: Aug. 5, 2021; 10 pages.

*Primary Examiner* — Dariush Seif
(74) *Attorney, Agent, or Firm* — CANTOR COLBURN LLP

(57) ABSTRACT

A packaging container (102) for storing products, the packaging container (102) comprises: a packaging container blank (102*a*) in open form for feeding in a container feeding holder (104), wherein the packaging container blank (102*a*) is a printed packaging container blank that includes a window cut out (126), fold lines (128*a*-128*d*), flaps (130*a*-130*n*), tabs (132*a*-132*m*), panels (134*a*-134*d*) or a combination thereof; a strapped leaflet unit (118) placed in a magazine of a folder and gluer unit (106), wherein the strapped leaflet unit (118) have a leaflet (114) and a dosage card (116) strapped in a strapping material; and adhesive drops dropped from the adhesive applicators (110*a*-110*n*) applied on one of on one of the panels (134*a*-134*d*) with the window cut (126) during the travel of the container blank (102*a*) over the conveyor (108).

7 Claims, 5 Drawing Sheets

(51) Int. Cl.
*B31B 50/62* (2017.01)
*B31B 50/81* (2017.01)
*B65D 5/02* (2006.01)

(52) U.S. Cl.
CPC .......... *B31B 50/811* (2017.08); *B65D 5/0227* (2013.01); *B65D 2203/06* (2013.01)

(58) Field of Classification Search
USPC ............................................................ 493/37
See application file for complete search history.

(56) References Cited

U.S. PATENT DOCUMENTS

| | | | | |
|---|---|---|---|---|
| 4,620,664 | A * | 11/1986 | Kaufman | B65D 5/4233 229/233 |
| 5,179,281 | A * | 1/1993 | Tawil | G01T 1/11 250/484.3 |
| 5,375,722 | A * | 12/1994 | Leary | B31B 50/00 250/559.46 |
| 6,070,719 | A * | 6/2000 | Pollock | B65D 5/4204 206/459.5 |
| 6,349,820 | B1 * | 2/2002 | Kelley | A47J 47/04 206/472 |
| 6,349,829 | B1 * | 2/2002 | Matheis | B65D 29/04 206/39 |
| 8,073,239 | B1 * | 12/2011 | Bahrami | G06T 7/001 382/141 |
| 2004/0035721 | A1 * | 2/2004 | Draghetti | B65D 85/1072 206/242 |
| 2007/0094901 | A1 * | 5/2007 | Kibbe | B42D 15/045 40/124.06 |
| 2010/0006631 | A1 * | 1/2010 | Edwards | B65D 5/0254 229/120.08 |
| 2010/0133128 | A1 * | 6/2010 | Preece | B65D 27/00 493/267 |
| 2010/0213092 | A1 * | 8/2010 | Swain | B65D 75/20 206/460 |
| 2010/0264058 | A1 * | 10/2010 | Krause | B65D 71/36 206/745 |
| 2011/0303740 | A1 * | 12/2011 | Schuld | B65D 5/662 229/160.1 |
| 2014/0102934 | A1 * | 4/2014 | Gatto | B65D 85/42 53/411 |
| 2014/0217159 | A1 * | 8/2014 | Schewe | B65D 5/4208 229/117.18 |
| 2015/0083628 | A1 * | 3/2015 | Coash | B42D 15/045 206/449 |
| 2015/0239603 | A1 * | 8/2015 | Folchini | B65D 5/02 156/227 |
| 2017/0318929 | A1 * | 11/2017 | Glass | B65D 27/00 |
| 2019/0168529 | A1 * | 6/2019 | Jones | B65D 27/00 |
| 2021/0186809 | A1 * | 6/2021 | DeJonghe | B65D 77/042 |
| 2023/0159216 | A1 * | 5/2023 | Porter | B65D 5/22 229/154 |
| 2023/0271745 | A1 * | 8/2023 | Tanna | B65D 5/4233 493/37 |

* cited by examiner

102

STRAPPED LEAFLET UNIT EMBEDDED IN A PACKAGING CONTAINER

This complete specification seeks priority from Indian provisional application number 202021030951 filed on 20th day of Jul. 2020 with title "A SPILLAGE RESISTANT LEAFLET AND METHOD OF PASTING THEREOF"

FIELD OF INVENTION

Embodiments of the present invention relates to packaging containers and a method for manufacturing an embedded leaflet packaging container along with other components.

BACKGROUND

Packaging containers are commonly made from cardboard or paperboard. However, by design, the containers have flaps, creases and perforations. Further, the packaging containers may be folded and assembled from a flat form, known as a container blank. Furthermore, the container blanks may wrap products along with a leaflet unit that convey information about the products.

Conventional packaging containers may have a missing leaflet unit due to insufficient space in the packaging container or due to a human/machine error. Further, the conventional packaging containers do not have the leaflet unit placed correctly in a right position, resulting in crumbled leaflet unit or torn leaflet unit leading to repacking of products or rejection of the packed products.

There is thus a need for an apparatus for manufacturing a packaging container in an effective and efficient manner.

SUMMARY

Embodiments in accordance with the present invention provide an apparatus for manufacturing a packaging container, the apparatus comprises: a container feeding holder for feeding a packaging container blank, wherein the packaging container blank is a printed packaging container blank that includes a window cut out, fold lines, flaps, tabs, panels or a combination thereof; a folder and gluer unit having a strapping unit for strapping a leaflet and a dosage card in a strapping material forming a strapped leaflet unit; conveyor for transferring the strapped leaflet unit from the magazine of the folder and gluer unit and the packaging container blank from the container feeding holder; adhesive applicators for pasting the strapped leaflet unit with an adhesive on one of the panels with the window cut of the packaging container moving on the conveyor; an inspection module having a first detection unit and a second detection unit, wherein the first detection unit checks and ensures the presence of the adhesive drops in real-time when dropped from the adhesive applicators on the packaging container blank, if the presence of the adhesive drops being detected, the packaging container blank goes ahead on the conveyor otherwise the packaging container blank is rejected and the second detection unit checks the presence of the strapped leaflet unit glued on the packaging container blank in real-time, if the presence of the strapped leaflet unit being detected, the packaging container blank goes ahead on the conveyor otherwise the packaging container blank is rejected.

Embodiments in accordance with the present invention provide a packaging container for storing products, the packaging container comprises: a packaging container for storing products, the packaging container comprises: a packaging container blank in open form for feeding in a container feeding holder, wherein the packaging container blank is a printed packaging container blank that includes a window cut out, fold lines, flaps, tabs, panels or a combination thereof; a strapped leaflet unit placed in a magazine of a folder and gluer unit, wherein the strapped leaflet unit have a leaflet and a dosage card strapped in a strapping material; and adhesive drops dropped from the adhesive applicators applied on one of on one of the panels with the window cut during the travel of the container blank over the conveyor.

Embodiments in accordance with the present invention provide method for manufacturing a packaging container, the method comprising the steps of: placing the packaging container blank in open form in a container feeding holder, wherein the container blank is a printed container that includes a window cut out, fold lines, flaps, tabs, panels, or a combination thereof; transferring a strapped leaflet unit placed in a magazine of a folder and gluer unit, wherein the strapped leaflet unit have a leaflet and a dosage card strapped in a strapping material; dispensing the strapped leaflet unit from the magazine of the folder and gluer unit and the packaging container blank from the container feeding holder at a time over a conveyor; applying adhesive drops when dropped from adhesive applicators on one of the panels with the window cut during the travel of the packaging container blank over the conveyor; checking and ensuring in real-time the presence of the adhesive drops on one of the panels with the window cut when dropped from the adhesive applicators by a first detection unit of an inspection module, wherein the presence of the adhesive drops being detected, the packaging container blank goes ahead on the conveyor otherwise the packaging container blank is rejected; sticking the strapped leaflet unit on the adhesive drops placed over the packaging container blank by matching positions against the window cut of the packaging container blank, wherein the presence of the strapped leaflet unit is checked and ensured by a second detection unit of the inspection module, the presence of the strapped leaflet unit being detected, the packaging container blank goes ahead on the conveyor otherwise the packaging container blank is rejected; and pasting one of the tabs of the packaging container blank using one of the adhesive applicators to form the packaging container.

Embodiments of the present invention may provide a number of advantages depending on its particular configuration. First, embodiments of the present application provide an apparatus for manufacturing a packaging container. Second, embodiments of the present application provide a packaging container for storing products. Third, embodiments of the present application provide a method for manufacturing a packaging container. Next, embodiments of the present application aim at ramping up the productivity.

Embodiments of the present invention may provide a method for manufacturing a packaging container that ensures the presence of a medication guide and other necessary components inside the packaging container. Further, a hazardous or emergency medical situation may arise in case those components are missing from the packaging container. Furthermore, the method for manufacturing the packaging container may offer an advantage to a consumer having a complete package of the packaging container without loss of any of the components which are absolutely necessary during the consumption of products.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
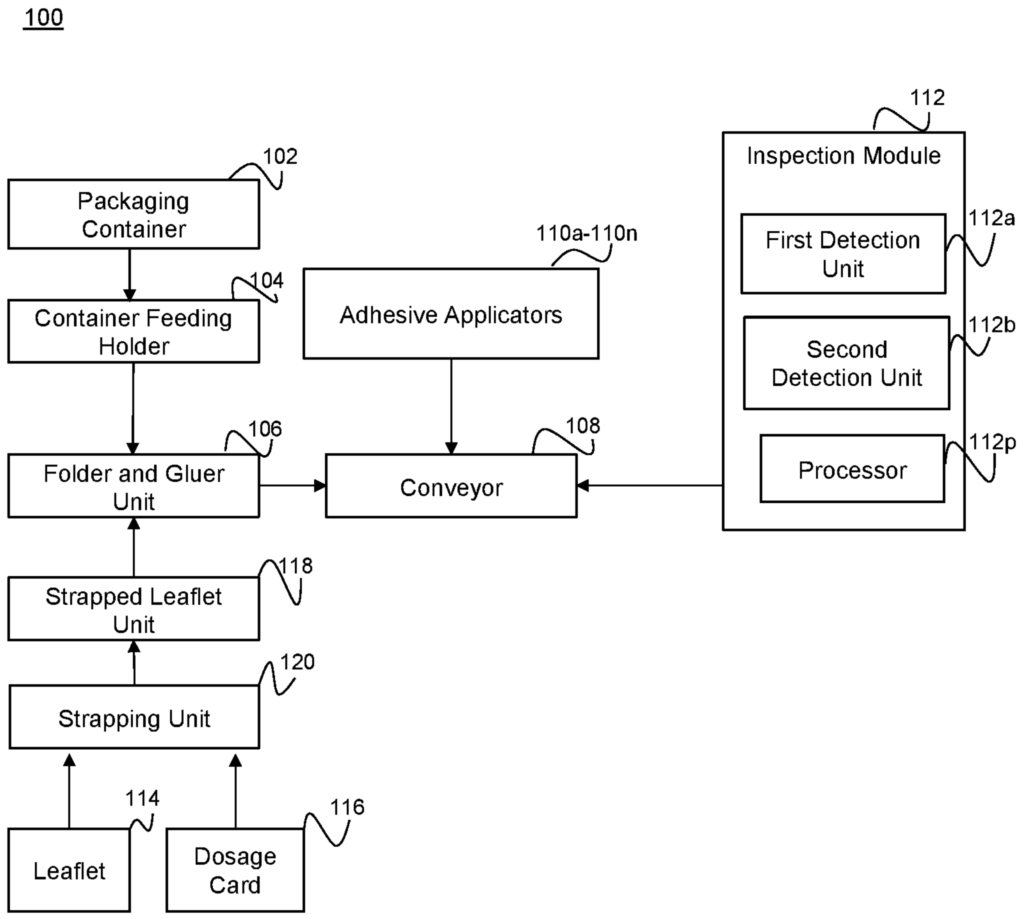
FIG. 1A illustrates a schematic representation of an apparatus for manufacturing a packaging container, according to embodiments of the present invention disclosed herein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments but the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of," the like.

As used herein, the singular forms "a", "an", and "the" designate both the singular and the plural, unless expressly stated to designate the singular only.

FIG. 1A illustrates a schematic representation of an apparatus 100 for manufacturing a packaging container 102, according to embodiments of the present invention. The apparatus 100 comprises a container feeding holder 104, a folder and gluer unit 106, a conveyor 108, adhesive applicators 110*a*-110*n* (hereinafter referred to as the adhesive applicators 110), and an inspection module 112, according to embodiments of the present invention.

According to embodiments of the present invention, the container feeding holder 104 may be employed for feeding a packaging container blank 102*a*. In preferred embodiments of the present invention, the packaging container blank 102*a* may be a printed packaging container blank. According to embodiments of the present invention, the packaging container blank 102*a* may be made up of a material, such as, but not limited to, a cardboard, a paperboard, a plastic, a kraft, a carton board, and so forth. Embodiments of the present invention are intended to include or otherwise cover any material of the packaging container blank 102*a* including known, related art, and/or later developed technologies. Further, the packaging container blank 102*a* may include such as, but not limited to, a window cut out 126, fold lines 128*a*-128*d* (hereinafter referred to as the fold lines 128), flaps 130*a*-130*n* (hereinafter referred to as the flaps 130), tabs 132*a*-132*m* (hereinafter referred to as the tabs 132), panels 134*a*-134*d* (hereinafter referred to as the panels 134). According to embodiments of the present invention, the container feeder holder 104 have a supply of the packaging container blank 102*a*.

According to embodiments of the present invention, the folder and gluer unit 106 may comprise a strapping unit 120 for strapping a leaflet 114 and a dosage card 116 in a strapping material forming a strapped leaflet unit 118. In an embodiment of the present invention, the strapping unit 120 may receive the leaflet 114 and the dosage card 116 and strap the leaflet 114 and the dosage card 116 in a thermoplastic polymer. The leaflet 114 may be small sheet of printed paper displaying information regarding products. Further, the dosage card 116 may be a printed card for measuring the right dose of the products. According to embodiments of the present invention, the strapping material may be, such as but not limited to, a paper, a plastic, a transparent polymer sheet, and so forth. Embodiments of the present invention are intended to include or otherwise cover any type of the strapping material including known, related art, and/or later developed technologies.

According to embodiments of the present invention, the conveyor 108 may transfer the strapped leaflet unit 118 received by the folder and gluer unit 106 and the packaging container blank 102*a* received by the container feeding holder 104 on a conveyor belt 122. The conveyor 108 may be employed for moving the strapped leaflet unit 118 and the packaging container 102 from one location to another. According to embodiments of the present invention, the conveyor 108 may be, such as, but not limited to, a wheel conveyor, a belt conveyor, a powered conveyor, a gravity conveyor, and so forth. Embodiments of the present invention are intended to include or otherwise cover any type of the conveyor 108 including known, related art, and/or later developed technologies.

According to embodiments of the present invention, the adhesive applicators 110 may paste the strapped leaflet unit 118 with an adhesive on one of the panels 134 with the window cut 126 of the packaging container 102 moving on the conveyor 108. According to embodiments of the present invention, the strapped leaflet unit 118 may be pasted on a single panel with the window cut 126 of the container blank 102*a*. According to embodiments of the present invention, the strapped leaflet unit 118 may be pasted on multiple panels with the window cut 126 of the container blank 102*a*. According to embodiments of the present invention, the adhesive applicators 110 may be, such as, but not limited to, wheel applicators, nozzle applicators, valve applicators, gun applicators, spray applicators, and so forth. Embodiments of the present invention are intended to include or otherwise cover any type of the adhesive applicators 110 including known, related art, and/or later developed technologies. According to embodiments of the present invention, the adhesive may be, such as, but not limited to, a natural adhesive, a synthetic adhesive, a reactive adhesive, a non-reactive adhesive, and so forth. According to embodiments of the present invention, the non-reactive adhesive may be, such as, but not limited to, a drying adhesive, a pressure sensitive adhesive, a hot adhesive, a contact adhesive, an anaerobic adhesive, a multi-component adhesive, a freezer grade adhesive, a spray adhesive, and so forth. In an embodiment of the present invention, the adhesive may be a permanent adhesive. In an embodiment of the present invention, the adhesive may be a re-closable adhesive. Embodiments of the present invention are intended to include or otherwise cover any type of the adhesive including known, related art, and/or later developed technologies. In another embodiment of the present invention, the strapped leaflet unit 118 may be sticked to the container blank 102*a* by a manual application of the adhesive. According to embodiments of the present invention, the adhesive drops may be re-closable adhesive drops dropped on the container blank 102*a* for pasting the strapped leaflet unit 118.

According to embodiments of the present invention, the inspection module 112 comprises a first detection unit 112*a* and a second detection unit 112*b*. The first detection unit 112*a* may check and ensure the presence of the adhesive drops in real-time when dropped from the adhesive applicators 110 on the packaging container blank 102*a*. Further, if the presence of the adhesive drops is being detected, then the packaging container blank 102*a* goes ahead on the conveyor 108 otherwise the packaging container 102 is rejected. Furthermore, the second detection unit 112*b* may check the presence of the strapped leaflet unit 118 glued on the packaging container blank 102*a* in real-time.

In an embodiment of the present invention, if the presence of the strapped leaflet unit 118 is being detected, the packaging container blank 102*a* goes ahead on the conveyor 108 otherwise the packaging container blank 102*a* is rejected. The adhesive applicators 110 paste one of the tabs 132 of the packaging container 102 with the adhesive. According to embodiments of the present invention, the first detection unit 112*a* may be, but not limited to, a camera, a sensor, and so forth. Embodiments are intended to include or otherwise cover any type of the first detection unit 112*a*, including known, related art, and/or later developed technologies. In an embodiment of the present invention, the first detection unit 112*a* may be placed at the top for checking the presence of the adhesive drops. In an exemplary scenario, the first detection unit 112*a* may be a camera that may be placed at the top for checking the presence of the adhesive drops.

According to embodiments of the present invention, the second detection unit 112*b* may be, but not limited to, a camera, a sensor, and so forth. In an embodiment of the present invention, the second detection unit 112*b* may be placed at the bottom for checking the presence of the strapped leaflet unit 118. In an exemplary scenario, the second detection unit 112*b* may be a camera that may be placed at the bottom for checking the presence of the strapped leaflet unit 118. Embodiments are intended to include or otherwise cover any type of the second detection unit 112*b*, including known, related art, and/or later developed technologies. Further, the adhesive applicators paste one of the tabs 132 of the packaging container blank 102*a* with the adhesive to form the packaging container 102.

Figure 1B:
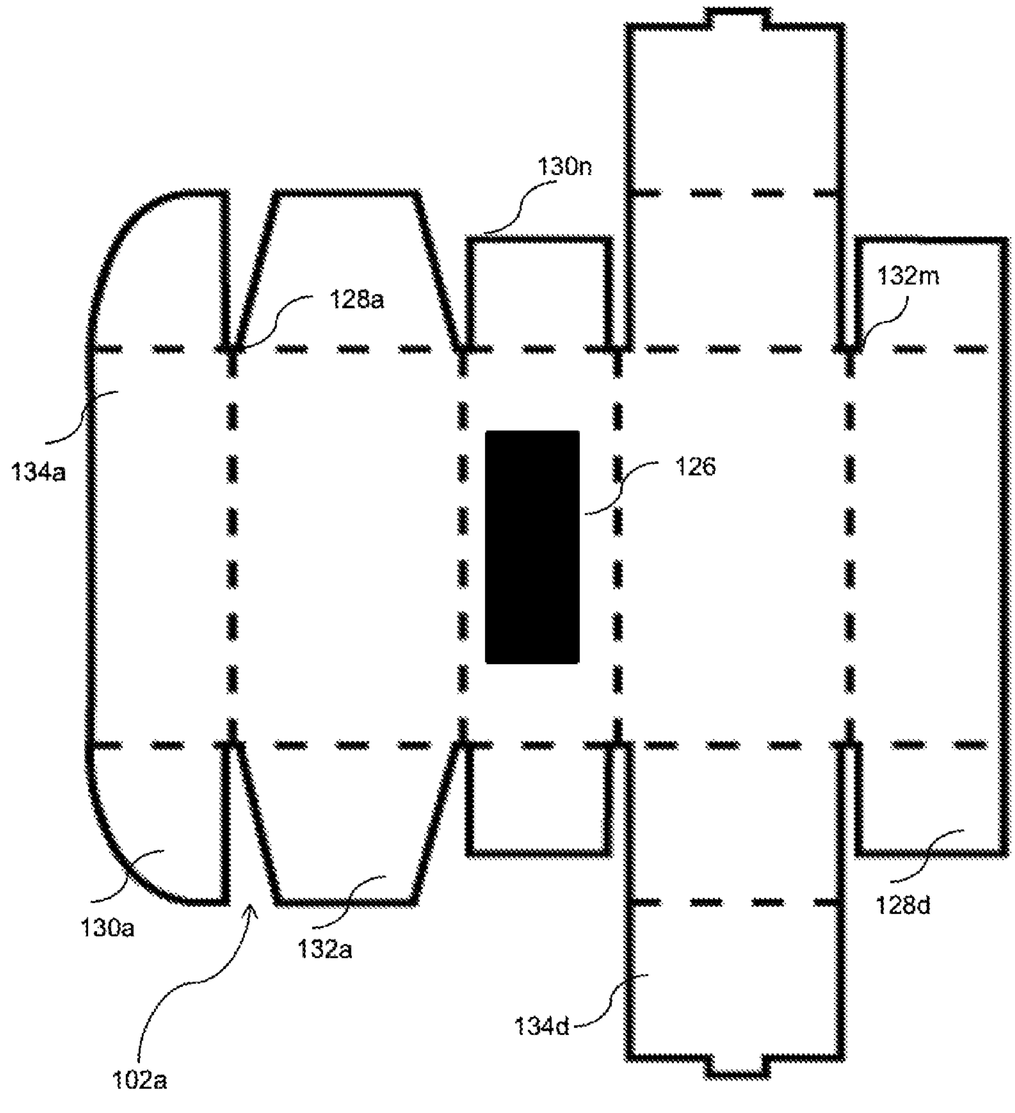
FIG. 1B illustrates a planar view of the packaging container with a window cut out, according to embodiments of the present invention disclosed herein.

FIG. 1B illustrates a planar view of the packaging container 102 with a window cut out 126, according to embodiments of the present invention. The packaging container 102 may be used for storing products. The packaging container 102 may comprise a container blank 102*a*, the strapped leaflet unit 118 and the adhesive drops. According to embodiments of the present invention, the packaging container 102 may be, such as, but not limited to, a wallet, a crate, a box, a sleeve, a catch cover, and so forth. Embodiments of the present invention are intended to include or otherwise cover any type of the packaging container 102 including known, related art, and/or later developed technologies. In preferred embodiments of the present invention, the packaging container 102 may be a packaging carton. According to embodiments of the present invention, the packaging container 102 may made of a material, such as, but not limited to, a paper, a cardboard, a foil, a plastic, and so forth. Embodiments of the present invention are intended to include or otherwise cover any material of the packaging container 102 including known, related art, and/or later developed technologies.

According to embodiments of the present invention, the container blank 102*a* may be the open form of the packaging container 102. The container blank 102*a* present in the open form may feed in the container feeding holder 104. Further, the container blank 102*a* may be a printed container blank. According to embodiments of the present invention, the container blank 112*a* may include a window cut out 126, fold lines 128, flaps 130, tabs 132, panels 134, and so forth. According to embodiments of the present invention, the container blank 102*a* may be made up of a material, such as, but not limited to, a cardboard, a paperboard, a plastic, a kraft, a carton board, and so forth. Embodiments of the present invention are intended to include or otherwise cover any material of the container blank 102*a* including known, related art, and/or later developed technologies.

According to embodiments of the present invention, the strapped leaflet unit 118 may be placed in a magazine of the folder and gluer unit 106. The strapped leaflet unit 118 comprises the leaflet 114 and the dosage card 116 strapped in the strapping material. The leaflet 114 may be small sheet of printed paper displaying information regarding products. Further, the dosage card 116 may be a printed card for measuring the right dose of the products. According to embodiments of the present invention, the strapping material may be, such as but not limited to, a paper, a plastic, a transparent polymer sheet, and so forth. Embodiments of the present invention are intended to include or otherwise cover any type of the strapping material including known, related art, and/or later developed technologies.

According to embodiments of the present invention, the adhesive drops dropped from the adhesive applicators 110 applied on one of on one of the panels 134 with the window cut 126 during the travel of the container blank 102*a* over the conveyor 108 for pasting the strapped leaflet unit 118. Further, the packaging container blank 102*a* may be pasted from one of the tabs 132 to form the packaging container 102 when the adhesive is applied from the adhesive applicators 110.

Figure 1C:
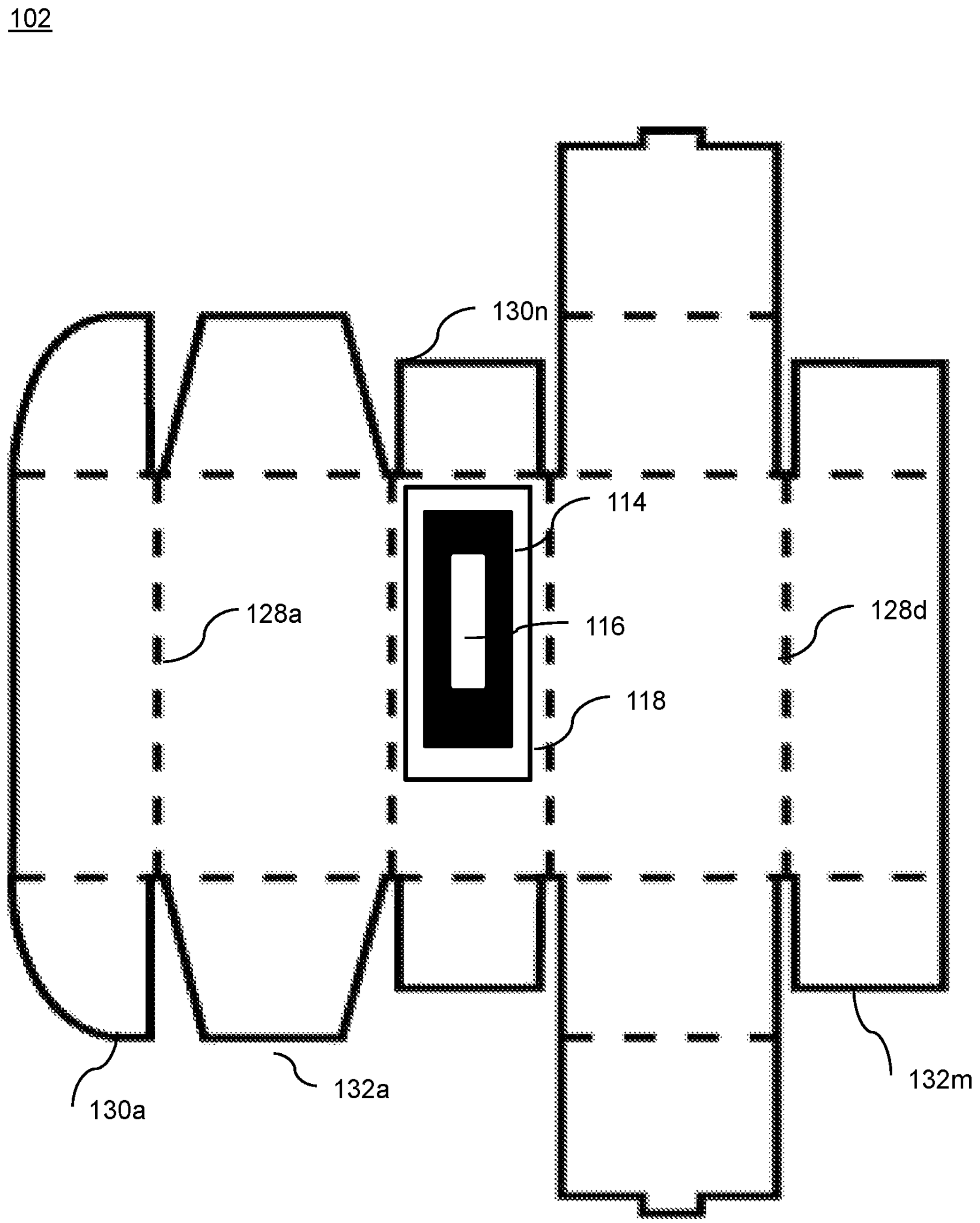
FIG. 1C illustrates a perspective view of the packaging container with a strapped leaflet unit sticked over the window cut out, according to embodiments of the present invention disclosed herein.

FIG. 1C illustrates a perspective view of the packaging container 102 with the strapped leaflet unit 118 sticked over the window cut out 126, according to embodiments of the present invention. According to embodiments of the present invention, the packaging container 102 may be, such as, but not limited to, a wallet, a crate, a box, a sleeve, a catch cover, and so forth. Embodiments of the present invention are intended to include or otherwise cover any type of the packaging container 102 including known, related art, and/or later developed technologies. In preferred embodiments of the present invention, the packaging container 102 may be a packaging carton. The strapped leaflet unit 118 may be sticked on a single panel of the packaging container blank 102*a* using the adhesive drops from the adhesive applicators 110. In an embodiment of the present invention, the strapped leaflet unit 118 may be sticked on multiple panels of the packaging container blank 102*a* using the adhesive drops from the adhesive applicators 110. In another embodiment of the present invention, strapped leaflet unit 118 may be sticked on the packaging container blank 102*a* by manual application.

Figure 1D:
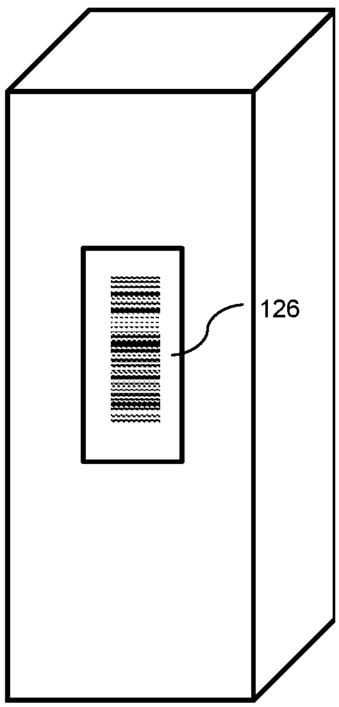
FIG. 1D illustrates a perspective view of an assembled packaging container, according to embodiments of the present invention disclosed herein.

FIG. 1D illustrates a perspective view of an assembled packaging container 102, according to embodiments of the present invention. The packaging container 102 may be transformed by pasting one of the tabs 132 of the container blank 102*a* using one of the adhesive applicators 110. According to embodiments of the present invention, the adhesive applicators 110 apply the adhesive on one of the tabs 132 of the container blank 102*a* so as to transform the container blank 102*a* to the packaging container 102. According to embodiments of the present invention, the adhesive applicators 110 may be, such as, but not limited to, wheel applicators, nozzle applicators, valve applicators, gun applicators, spray applicators, and so forth. Embodiments of the present invention are intended to include or otherwise cover any type of the adhesive applicators 110 including known, related art, and/or later developed technologies. According to embodiments of the present invention, the adhesive may be, such as, but not limited to, a natural adhesive, a synthetic adhesive, a reactive adhesive, a non-reactive adhesive, and so forth. According to embodiments of the present invention, the non-reactive adhesive may be, such as, but not limited to, a drying adhesive, a pressure sensitive adhesive, a hot adhesive, a contact adhesive, an anaerobic adhesive, a multi-component adhesive, a freezer grade adhesive, a spray adhesive, and so forth. In an embodiment of the present invention, the adhesive may be a permanent adhesive. In an embodiment of the present invention, the adhesive may be a re-closable adhesive. Embodiments of the present invention are intended to include or otherwise cover any type of the adhesive including known, related art, and/or later developed technologies. In another embodiment of the present invention, the packaging container 102 may be formed by pasting one of the tabs 132 of the container blank 102*a* by manual application of the adhesive.

Figure 2:
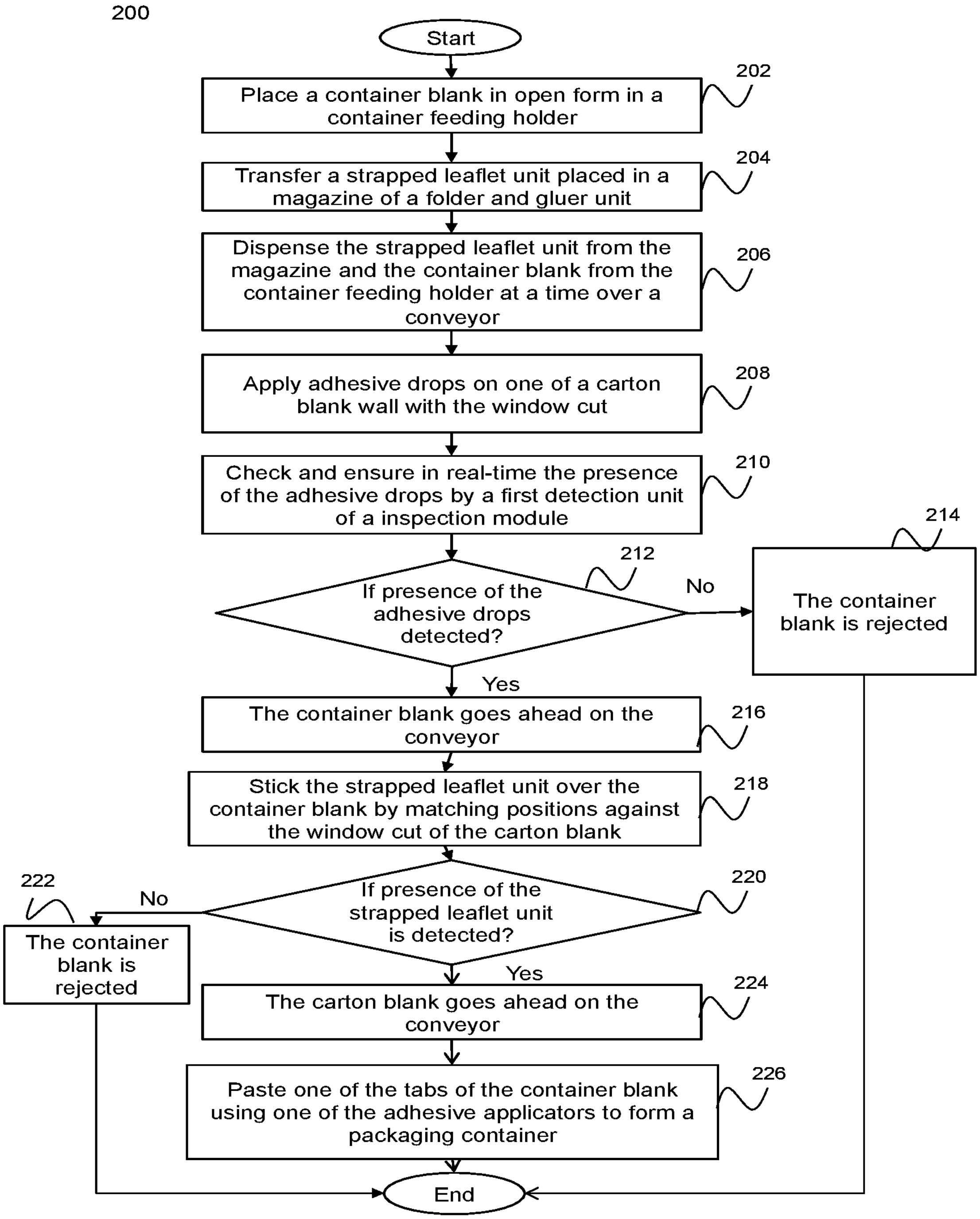
FIG. 2 illustrates a flowchart of a process of manufacturing the packaging container, according to embodiments of the present invention disclosed herein.

FIG. 2 illustrates a flowchart of a process for manufacturing a packaging container 102 using the apparatus 100, according to embodiments of the present invention.

At a step 202, the apparatus 100 may comprise the container blank 102*a* in open form that may be placed in the container feeding holder 104. Further, the container blank 102*a* may be the printed container that may include a window cut 126, fold lines 128, flaps 130, tabs 132, panels 134, and so forth.

At a step 204, the apparatus 100 may comprise the strapped leaflet unit 118 that may be placed in the folder and gluer unit 106. Further, the strapped leaflet unit 114 comprises the leaflet and the dosage card 116 strapped in the strapping material.

At a step 206, the apparatus 100 may comprise the strapped leaflet unit 118 that may be dispensed from the magazine of the folder and gluer unit 106 and the container blank 102*a* from the container feeding holder 104 at a time over the conveyor 108.

At a step 208, the apparatus 100 may apply the adhesive drops using the adhesive applicators 110 on one of the panels 134 with the window cut 126 during the travel of the container blank 102 over the conveyor 108.

At a step 210, the apparatus 100 may determine the presence of the adhesive drops that may be checked and ensured when dropped from the adhesive applicators 110 by the first detection unit 112*a* of the inspection module 112.

At a step 212, the apparatus 100 may check the presence of the adhesive drops on one of the panels 134 with the window cut 126 using the inspection module 112. Further, if the apparatus 100 determines the presence of the adhesive drops, then the process 200 may proceed to a step 216. On the other hand, if the apparatus 100 determines that there is absence of the adhesive drops on one of the panels 134 with the window cut 126, then the process 200 may proceed to a step 214.

At the step 214, the apparatus 100 may reject the container blank 102*a* through an ejection point of the apparatus 100 and the process 200 may end.

At the step 216, the apparatus 100 may move ahead the container blank 102*a* on the conveyor 108.

At a step 218, the apparatus 100 may stick the strapped leaflet unit 118 on the adhesive drops placed over the container blank 102*a* by matching positions against the window cut 126 of the container blank 102*a*.

At a step 220, the apparatus 100 may check the presence of the strapped leaflet unit 118 being stick to the adhesive drops on one of the panels 134 with the window cut 126 using the inspection module 112. Further, if the apparatus 100 determines the presence of the strapped leaflet unit 118, then the process 200 may proceed to a step 222. On the other hand, if the apparatus 100 determines that there is absence of the strapped leaflet unit 118 on one of the panels 134 with the window cut 126, then the process 200 may proceed to a step 224.

At the step 222, the apparatus 100 may reject the container blank 102*a* through an ejection point of the apparatus 100 and the process 200 may end.

At the step 224, the apparatus 100 may move ahead the container blank 102*a* on the conveyor 108.

At a step 226, the apparatus 100 may paste one of the tabs 132 of the container blank 102*a* using one of the adhesive applicators 110 to form the packaging container 102.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements within substantial differences from the literal languages of the claims.

I claim:

1. An apparatus for manufacturing a packaging container, the apparatus comprises:

a container feeding holder for feeding a packaging container blank, wherein the packaging container blank is a printed packaging container blank that includes a window cutout, fold lines, flaps, tabs, panels;

a folder and gluer unit having a strapping unit for strapping a leaflet and a dosage card in a strapping material forming a strapped leaflet unit;

a conveyor for transferring the strapped leaflet unit from a magazine of the folder and gluer unit and the packaging container blank from the container feeding holder;

adhesive applicators for pasting the strapped leaflet unit with adhesive on at least one of the panels with the window cut of the packaging container moving on the conveyor; and an inspection module having a first detection unit and a second detection unit, wherein the first detection unit checks and ensures the presence of adhesive drops in real-time when dropped from the adhesive applicators on the packaging container blank, when the presence of the adhesive drops being detected, the packaging container blank goes ahead on the conveyor otherwise the packaging container blank is rejected and the second detection unit checks the presence of the strapped leaflet unit glued on the packaging container blank in real-time, when the presence of the strapped leaflet unit being detected, the packaging container blank goes ahead on the conveyor otherwise the packaging container blank is rejected.

2. The apparatus as claimed in claim 1, wherein the adhesive applicators applies the adhesive drops to one of the tabs of the packaging container blank.

3. The apparatus as claimed in claim 1, wherein the first detection unit comprises a camera, a sensor, or a combination thereof.

4. The apparatus as claimed in claim 1, wherein the second detection unit comprises a camera, a sensor, or a combination thereof.

5. A packaging container for storing products, the packaging container comprises:

a packaging container blank, wherein the packaging container blank is a printed packaging container blank that includes a window cutout, fold lines, flaps, tabs, panels, a strapped leaflet unit, wherein the strapped leaflet unit has a leaflet and a dosage card strapped in a strapping material; and wherein the strapping material is a transparent polymer sheet;

adhesive drops applied on one of the panels with the window cut, such that the strapped leaflet is glued to one of the panels with the window cutout, wherein the adhesive drops are applied to one of the tabs of the packaging container blank, and the flaps, tabs and panels are folded along the fold lines, to form a packaging container.

6. The packaging container as claimed in claim 5, wherein the packaging container is made of a material selected from the group consisting of a paper, a cardboard, a foil, a plastic, or a combination thereof.

7. A method for manufacturing a packaging container, the method comprising the steps of:

placing a packaging container blank in open form in a container feeding holder, wherein the container blank is a printed container that includes a window cutout, fold lines, flaps, tabs (132*a*132*m*), panels, dispensing the packaging container blank from the container feeding holder over a conveyor;

transferring a strapped leaflet unit placed in a magazine of a folder and gluer unit, wherein the strapped leaflet unit have a leaflet and a dosage card strapped in a strapping material;

dispensing the strapped leaflet unit from the magazine of the folder and gluer unit one at a time over the conveyor;

applying adhesive drops from adhesive applicators on one of the panels with the window cut during travel of the packaging container blank over the conveyor;

checking and ensuring in real-time the presence of the adhesive drops on one of the panels with the window cut when dropped from the adhesive applicators by a first detection unit of an inspection module, wherein the presence of the adhesive drops being detected, the packaging container blank goes ahead on the conveyor otherwise the packaging container blank is rejected;

dispensing the strapped leaflet unit from the magazine of the folder and gluer unit on the adhesive drops placed over the packaging container blank and against the window cut of the packaging container blank, wherein the presence of the strapped leaflet unit is checked and ensured by a second detection unit of the inspection module, the presence of the strapped leaflet unit being detected, the packaging container blank goes ahead on the conveyor otherwise the packaging container blank is rejected; and applying adhesive to one of the tabs of the packaging container blank using one of the adhesive applicators, and folding the flaps, tabs and panels along the fold lines, to form the packaging container.

* * * * *